(12) United States Patent
Bertrand et al.

(10) Patent No.: US 9,113,325 B2
(45) Date of Patent: Aug. 18, 2015

(54) SIGNALING OF RANDOM ACCESS PREAMBLE TIME-FREQUENCY LOCATION IN WIRELESS NETWORKS

(75) Inventors: Pierre Bertrand, Antibes (FR); Tarik Muharemovic, Dallas, TX (US); Jing Jiang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1519 days.

(21) Appl. No.: 12/109,520

(22) Filed: Apr. 25, 2008

(65) Prior Publication Data

US 2008/0267161 A1  Oct. 30, 2008

Related U.S. Application Data

(60) Provisional application No. 60/913,912, filed on Apr. 25, 2007.

(30) Foreign Application Priority Data

Apr. 25, 2007 (EP) ..................... 07290513
Jul. 20, 2007 (EP) ..................... 07290911
Aug. 7, 2007 (EP) ..................... 07290985

(51) Int. Cl.
H04B 7/212 (2006.01)
H04W 16/02 (2009.01)
H04W 74/08 (2009.01)
H04W 74/00 (2009.01)

(52) U.S. Cl.
CPC ............ *H04W 16/02* (2013.01); *H04W 74/008* (2013.01); *H04W 74/0833* (2013.01); *H04W 74/0866* (2013.01)

(58) Field of Classification Search
CPC .............. H04W 74/00; H04W 74/008; H04W 74/0833
USPC .................. 370/350, 329, 335, 342, 348, 345
See application file for complete search history.

(56) References Cited

U.S. PATENT DOCUMENTS 4,414,661 A * 11/1983 Karlstrom ..................... 370/332
5,278,833 A * 1/1994 Crisler et al. ................. 370/348

(Continued)

FOREIGN PATENT DOCUMENTS

EP          1715709 A1   10/2006

OTHER PUBLICATIONS

TSG-RAN Meeting #10 (Agreed Crs to TR25.922); TSG-RAN WG2; 2000; pp. 1-19.*

*Primary Examiner* — Ricky Ngo
*Assistant Examiner* — Dewanda Samuel
(74) *Attorney, Agent, or Firm* — Ronald O. Neerings; Frank D. Cimino

(57) ABSTRACT

Embodiments of the present disclosure provide a base station sub-system, a method of allocating random access configurations and a method of downlink signaling of random access configurations. In one embodiment, the base station sub-system is for use in a wireless communication system and includes an allocator configured to allocate random access configurations having a plurality of time slots that use a single frequency resource. Additionally, the base station sub-system also includes a transmitter configured to signal at least one index of the random access configurations and a random access receiver balancing in time the processing load of the random access detection of different cells served by the base station.

13 Claims, 5 Drawing Sheets

(56) References Cited

U.S. PATENT DOCUMENTS

| | | | |
|---|---|---|---|
| 5,280,630 A * | 1/1994 | Wang | 455/452.2 |
| 5,521,925 A * | 5/1996 | Merakos et al. | 370/337 |
| 5,748,624 A * | 5/1998 | Kondo | 370/347 |
| 6,163,533 A | 12/2000 | Esmailzadeh et al. | |
| 6,611,514 B1 * | 8/2003 | Moulsley | 370/348 |
| 6,621,803 B2 * | 9/2003 | Halton et al. | 370/342 |
| 6,654,612 B1 * | 11/2003 | Avidor et al. | 455/450 |
| 6,771,632 B2 * | 8/2004 | Dick et al. | 370/342 |
| 6,778,835 B2 * | 8/2004 | You et al. | 455/455 |
| 6,985,474 B2 * | 1/2006 | Dahlman et al. | 370/347 |
| 7,088,734 B2 * | 8/2006 | Newberg et al. | 370/437 |
| 7,420,949 B2 * | 9/2008 | Helmke | 370/337 |
| 7,519,041 B2 * | 4/2009 | Cai | 370/342 |
| 7,529,210 B2 * | 5/2009 | Dick et al. | 370/335 |
| 7,821,991 B2 * | 10/2010 | Iwai et al. | 370/328 |
| 7,873,000 B2 * | 1/2011 | Cheng et al. | 370/329 |
| 2002/0075839 A1 * | 6/2002 | Dick et al. | 370/342 |
| 2002/0089957 A1 * | 7/2002 | Viero | 370/336 |
| 2005/0078736 A1 * | 4/2005 | Lakkis | 375/130 |
| 2008/0075043 A1 | 3/2008 | Wang et al. | |

* cited by examiner

SIGNALING OF RANDOM ACCESS PREAMBLE TIME-FREQUENCY LOCATION IN WIRELESS NETWORKS

CROSS-REFERENCE TO PROVISIONAL APPLICATIONS

This application claims the benefit of European Application No. 07290513.6 entitled "Signalling of Random Access Preamble Time-Frequency Location in Wireless Networks" to Pierre Bertrand, Tarik Muharemovic and Jing Jiang filed on 25 Apr. 2007, and U.S. Provisional Application No. 60/913,912 entitled "Signalling of Random Access Preamble Time-Frequency Location in Wireless Networks" to Pierre Bertrand, Tarik Muharemovic and Jing Jiang filed on Apr. 25, 2007, and European Application No. 07290911.2 entitled "Optimized Random Access Time Slot Locations in Wireless Networks" to Pierre Bertrand filed on 20 Jul. 2007, and European Application No. 07290985.6 entitled "Optimized Random Access Time Slot Locations in Wireless Networks— Update 1" to Pierre Bertrand and Jing Jiang filed on 7 Aug. 2007, which are incorporated herein by reference in their entirety.

TECHNICAL FIELD

The present disclosure is directed, in general, to a wireless communication system and, more specifically, to a base station sub-system, a method of allocating random access configurations and a method of downlink signaling of random access configurations.

BACKGROUND

As wireless systems become more prominent, an expanding number of users and their demand for new services necessitate the development of technologies capable of meeting ever increasing expectations. Users of mobile communication devices expect not only globally available and reliable voice communications, but a variety of data services such as e-mail, text messaging and internet access with connectivity to video, as well. Consequently, the random access channel is intended to encompass a wider range of functionalities thereby increasing its expected load. The random access signal, through which user equipment initiates the random access procedure, needs to accommodate variable cell sizes and data requirements. Additionally, the user equipment is required to provide its serving base station with sufficient information to effectively prioritize resource requirements. Although current systems provide adequate functionality, improvements would prove beneficial in the art.

SUMMARY

Embodiments of the present disclosure provide a base station sub-system, a method of allocating random access configurations and a method of downlink signaling of random access configurations. In one embodiment, the base station sub-system is for use in a wireless communication system and includes an allocator configured to allocate random access configurations having a plurality of time slots that use a single frequency resource. Additionally, the base station sub-system also includes a transmitter configured to signal at least one index of the random access configurations.

In another aspect, the present disclosure provides a method of allocating random access configurations in a wireless communication network. The method includes selecting a first random access slot configuration having a plurality of time slots and assigning the first random access slot configuration to a first cell of the wireless communication network. The method also includes selecting a second random access slot configuration having a plurality of non-overlapping time slots with respect to the first random access slot configuration and assigning the second random access slot configuration to a second cell of the wireless communication network.

The method of downlink signaling of random access configurations in a wireless communication network includes providing a random access configuration having a plurality of time slots and using a single frequency resource. The method also includes defining a periodic pattern for the random access configuration and assigning a time origin for a first time slot of the periodic pattern.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

In one example of a wireless communication network, OFDMA and SC-FDMA (single carrier FDMA) access schemes are employed for the downlink (DL) and uplink (UL) signals, respectively. User equipments (UEs) are time and frequency multiplexed on a physical uplink shared channel (PUSCH), and a fine time and frequency synchronization between UEs guarantees optimal intra-cell orthogonality. If the UE is not UL-synchronized, it uses a non-synchronized physical random access channel (PRACH), and the base station (also referred to as the NodeB) provides an allocated UL resource and timing information to enable the UE transmitting on the PUSCH. PRACH preambles may be sent during random access (RA) time-frequency slots, wherein duration and bandwidth may be defined. Embodiments of the present disclosure provide an efficient way to organize and signal the position and structure of RA time-frequency slots.

Figure 1:
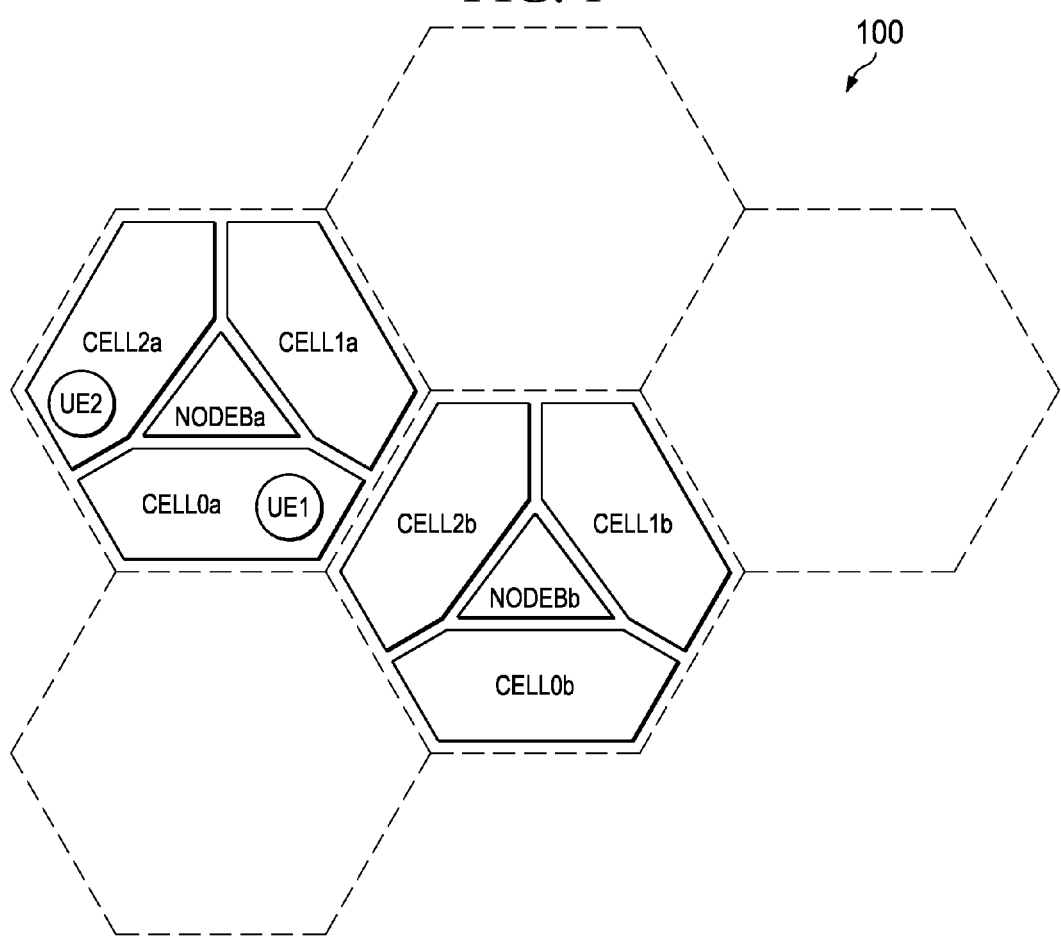
FIG. 1 illustrates a diagram of a wireless communication network as provided by one embodiment of the disclosure.

FIG. 1 illustrates a diagram of a wireless communication network 100 as provided by one embodiment of the disclosure. The wireless communication network 100 is composed of a plurality of cells wherein the plurality of the cells is controlled by a NodeB. The wireless communication network 100 includes first and second base stations NodeBa, NodeBb that respectively control a first group of cells cell0a, cell1a, cell2a and a second group of cells cell0b, cell1b, cell2b, as shown. The first group of cells has corresponding cell identifications cellID0a, cellID1a and cellID2a, and the second group of cells has corresponding cell identifications cellID0b, cellID1b and cellID2b.

The first and second NodeBs provide downlink signaling of specific information corresponding to a random access channel that is employed in each of the corresponding six cells that are respectively under their control. These characteristics inform UEs operating within each of the cells, the pattern and period characteristics associated with a random access slot configuration that is to be employed in uplink communications with the serving NodeB. Embodiments of these random access configurations are presented below.

Figure 2:
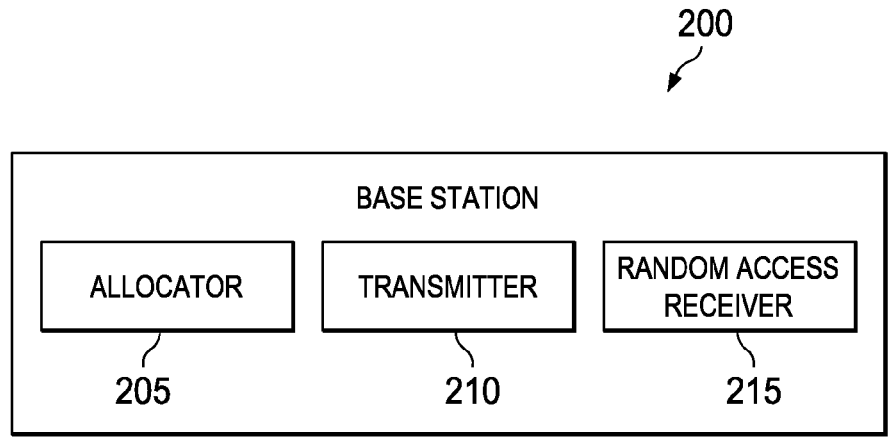
FIG. 2 illustrates a diagram of an embodiment of a base station as may be employed by the wireless communication network of FIG. 1.

FIG. 2 illustrates a diagram of an embodiment of a base station 200 as may be employed by the wireless communication network 100 of FIG. 1. The base station 200 includes an allocator 205, a transmitter 210 and a random access receiver 215. The allocator 205 is configured to allocate random access configurations having a plurality of time slots that use a single frequency resource. Correspondingly, the transmitter 210 is configured to signal at least one index of the random access configurations associated with the cells under control of the NodeB 200. The random access receiver 215 is configured to detect random access signals during the random access time slots of the random access configurations associated with the cells under control of the NodeB 200.

In the illustrated embodiment, random access channel loading information from a plurality of cells is used to allocate a corresponding plurality of random access configurations wherein one or more random access contention-based transmissions may occur during one time slot, and a single random access transmission is limited to a duration of one time slot. Additionally, the time slots provided by each of the allocated random access configurations are non-overlapping in time.

In order to minimize the signaling overhead, a plurality of random access configurations are pre-defined in the wireless standard to address a sufficient number of cell configurations and random access loads. Therefore, the configuration set is known by both the UE and the NodeB and signaling a random access configuration reduces to signaling the configuration index in the configuration set. As further elaborated below, a random access configuration is defined by several parameters (period, offset), which would each require several bits to transmit if they were broadcasted individually and would result in a non-justified large overhead.

Generally, four bits are used in the at least one index to signal each of twelve or more possible random access configurations. Broadcast signaling is used to provide the at least one index. Examples of this four bit index are discussed in FIGS. 4 and 5 below. In one embodiment, initial time offsets corresponding to the random access configurations used in respective cells are derived from cell IDs of the respective cells, as discussed below.

A cell may be represented and identified by the combination of a physical-layer cell identity (among three) and a physical-layer cell-identity group (among 170). There is a one-to-one mapping between the three physical-layer cell identities within the physical-layer cell-identity group and the three sequences used for the primary synchronization signal in the cell search procedure. These three sequences are orthogonal and are incrementally allocated to neighboring cells of the same NodeB, to facilitate the cell search.

As a result, a one-to-one mapping can be done between primary synchronization signal sequence and the cell index used in FIGS. 4 and 5 below. Therefore, the only information that the NodeB needs to broadcast is the RA load configuration defining both the RA slot period and time offset between cells, as shown in Table 1 below.

TABLE 1

| RA Slot Configuration No. | RA Period (sub-frames) | Offset Increment (sub-frames) |
|---|---|---|
| 0 | 20 | 3 |
| 1 | 10 | 3 |
| 2 | 5 | 1 |
| 3 | 3 | 1 |
| 4 | 2 | 1 |
| 5 | 1 | 0 |
| 6 | reserved | |
| 7 | reserved | |

This action results in three bits instead of previously four bits being required to signal the RA slot configuration.

Figure 3:
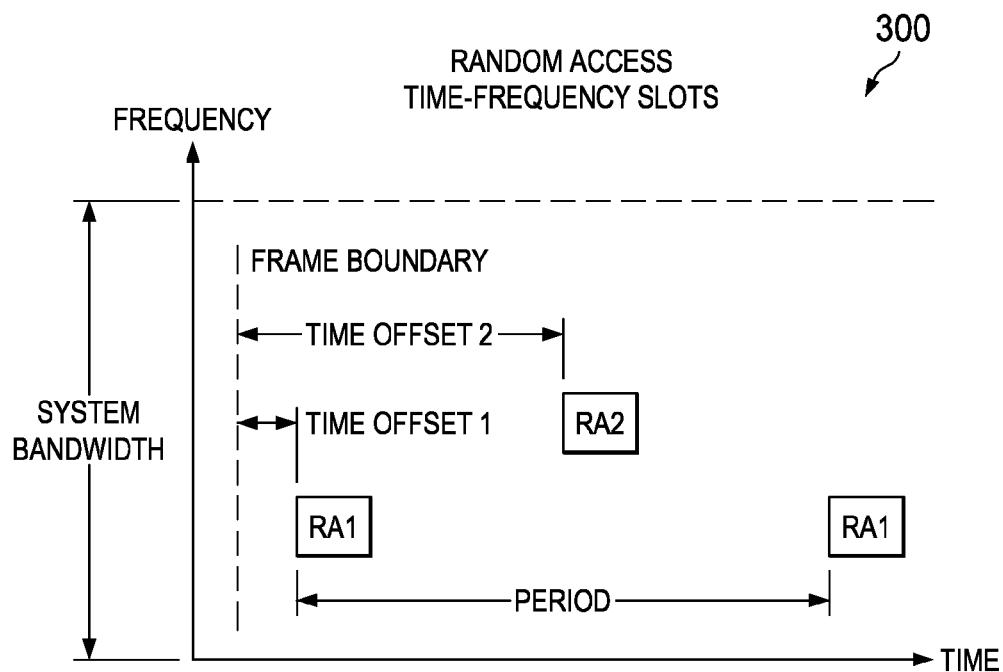
FIG. 3 illustrates a diagram of an embodiment of random access time-frequency slots as may be allocated by the wireless communication network of FIG. 1.

FIG. 3 illustrates a diagram of an embodiment of random access time-frequency slots 300 as may be allocated by the wireless communication network 100 of FIG. 1. The diagram 300 shows first and second RA time-frequency slots RA1, RA2 as may be employed by first and second cells controlled by a NodeB. A first time offset associated with a first RA slot configuration and a second time offset associated with a second RA slot configuration are shown.

Both the first and second time offsets are referenced to a frame boundary, which may be system frame number zero. Alternately, the second time offset may be referenced to the first RA time-frequency slot. Additionally, a time period between two successive first RA slots is shown. As will be discussed below, successive RA slots form a periodic pattern. It may be noted that, in this embodiment, the first RA time-frequency slots RA1 occupy a frequency resource that does not overlap with the second RA time-frequency slots RA2. In another embodiment, the first RA time-frequency slots RA1 may occupy the same frequency resource as the second RA time-frequency slots RA2. Since only one RA time-frequency slot is scheduled at a time, higher RA loads such as encountered in higher system bandwidths are accommodated by reducing the time period between the RA time-frequency slots.

The time period of the RA time-frequency slot may be as small as one sub-frame for high system bandwidths, which is the exception case where time-frequency slots of RA configuration RA1 will overlap time-frequency slots of RA configuration RA2. Reducing the time period of the RA time-frequency slots instead of configuring additional concurrent RA time-frequency slots in the frequency dimension provides the benefit of a simple signaling scheme, smaller waiting times between slots and reduced random access receiver peak processing (and therefore reduced NodeB complexity).

Figure 4:
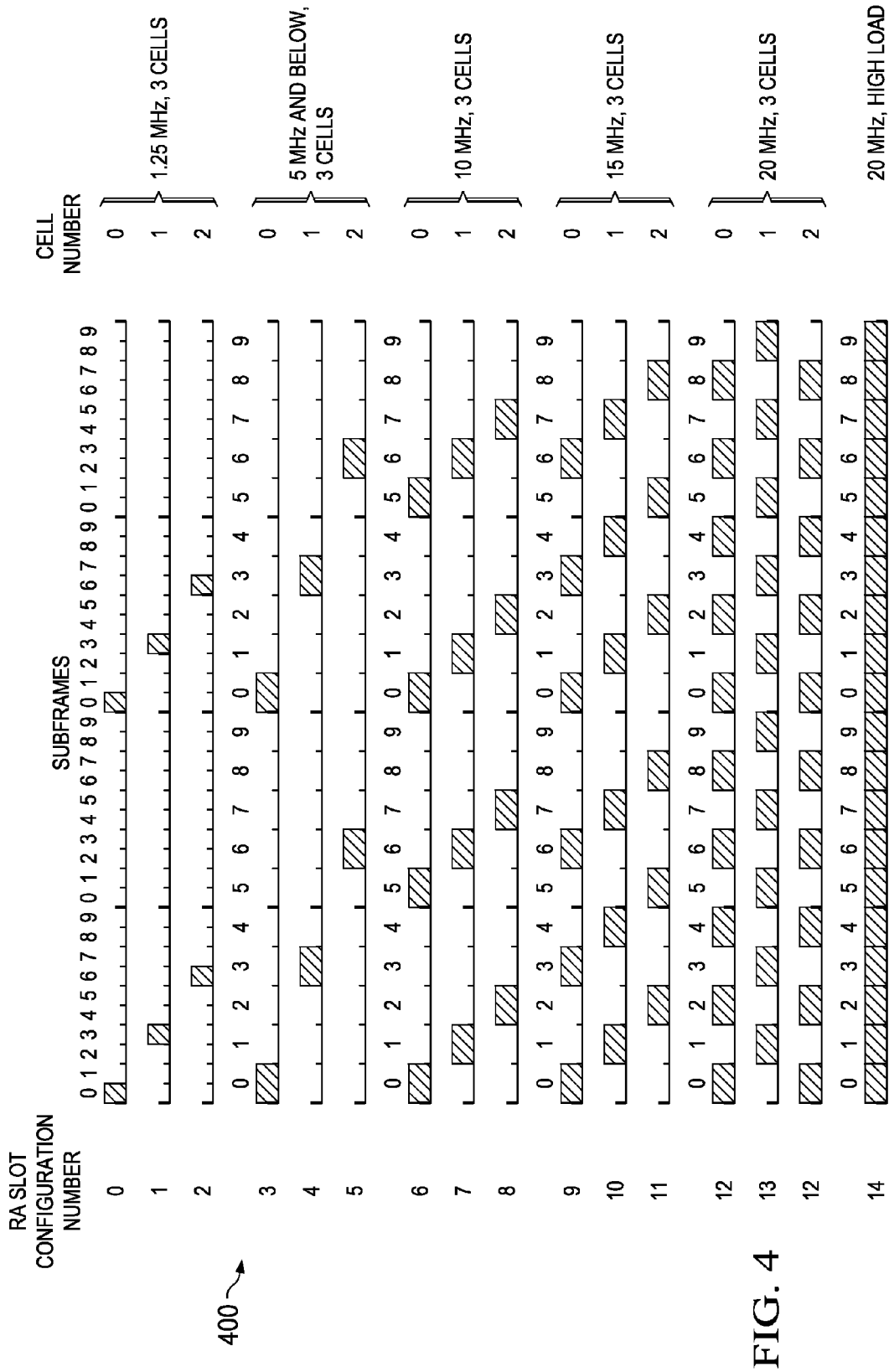
FIG. 4 illustrates a timing diagram of an embodiment of random access time-frequency slots as may be allocated and signaled by the wireless communication network of FIG. 1.

FIG. 4 illustrates a timing diagram of an embodiment of random access time-frequency slots 400 as may be allocated and signaled by the wireless communication network 100 of FIG. 1. Table 2 shows a possible 16 predefined RA slot configurations wherein usage and cell allocation depending on the system bandwidth for 15 of these RA slot configurations are illustrated in FIG. 4. It may be noted that RA slot configurations 9, 10, and 11 show three subsequent periods defining a 10 sub-frame periodic pattern, as illustrated in FIG. 4.

TABLE 2

| RA Slot Configuration No. | RA Period(s) (sub-frames) | Offset (sub-frames) | System Frame Number | Subframe Number |
|---|---|---|---|---|
| 0 | 20 | 0 | Even | 0 |
| 1 | 20 | 3 | Even | 3 |
| 2 | 20 | 6 | Even | 6 |
| 3 | 10 | 0 | Any | 0 |
| 4 | 10 | 3 | Any | 3 |
| 5 | 10 | 6 | Any | 6 |
| 6 | 5 | 0 | Any | 0, 5 |
| 7 | 5 | 1 | Any | 1, 6 |
| 8 | 5 | 2 | Any | 2, 7 |
| 9 | 3-3-4 | 0 | Any | 0, 3, 6 |
| 10 | 3-3-4 | 1 | Any | 1, 4, 7 |
| 11 | 3-3-4 | 2 | Any | 2, 5, 8 |
| 12 | 2 | 0 | Any | 0, 2, 4, 6, 8 |
| 13 | 2 | 1 | Any | 1, 3, 5, 7, 9 |
| 14 | 1 | 0 | Any | 0, 1, 2, 3, 4, 5, 6, 7, 8, 9 |
| 15 | | | | reserved |

Table 2 and the resulting FIG. 4 are an illustrative example assuming a normal load scaled over increasing bandwidth, but the use of increasing RA slot configuration index can also be understood to address an increasing RA load, given a system bandwidth.

RA Slot configurations 0-2 use a 20 ms RA period, which can be desired for small bandwidths (e.g. 1.4 MHz or 6 RBs) in order to reduce the RA overhead at the price of higher waiting times. Slot configuration 14 is an additional configuration that copes with high RA loads. In order to get 16 values (4 bits), an additional RA configuration is reserved for future use. It may be observed that in a three-cell scenario, time "collision" of RA slots can always be avoided except for the 20 MHz case, where it is minimized to two RA slots occurring in the same sub-frame.

Figure 5:
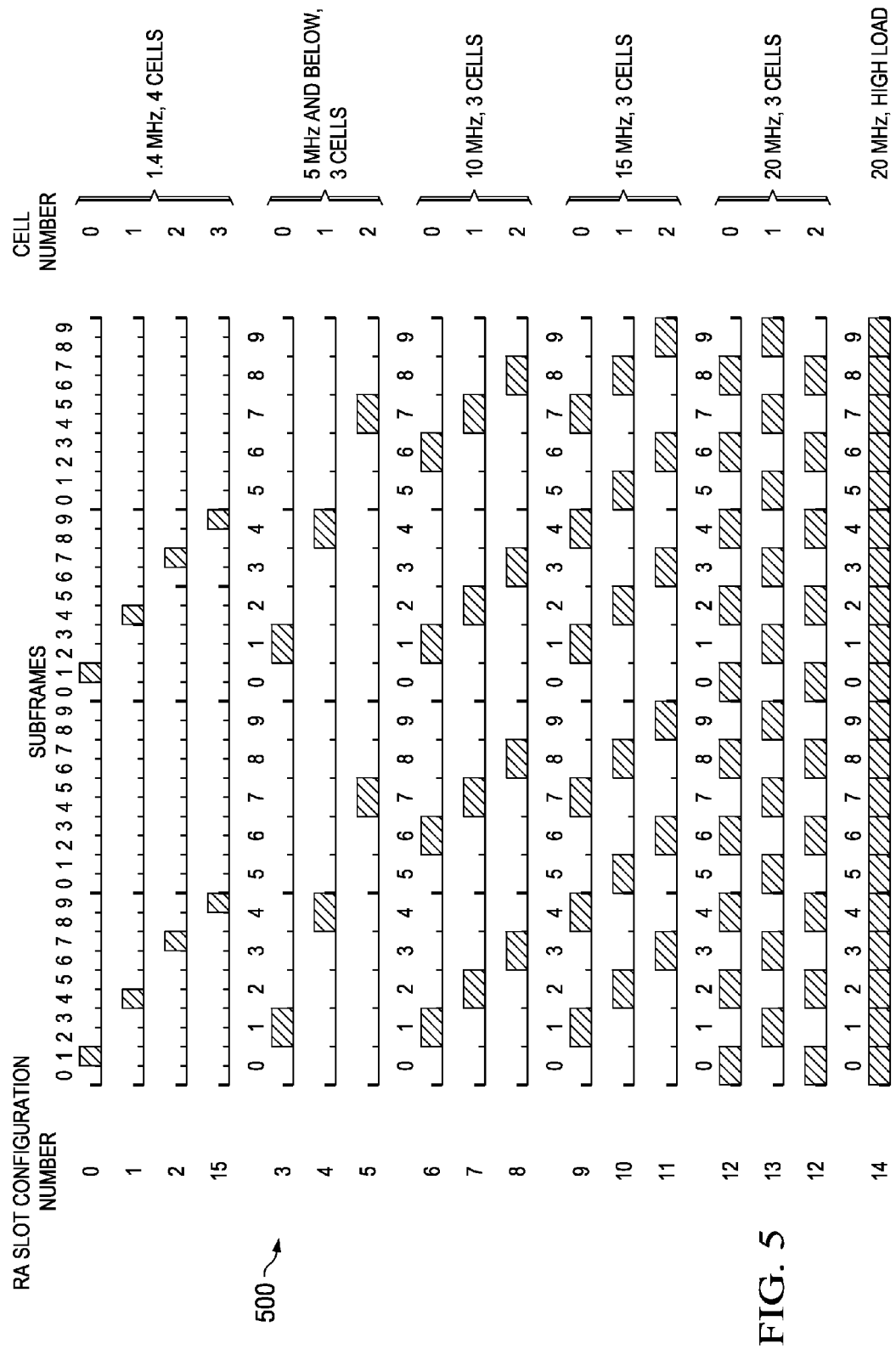
FIG. 5 illustrates a timing diagram of another embodiment of random access time-frequency slots as may be allocated and signaled by the wireless communication network of FIG. 1.

FIG. 5 illustrates a timing diagram of another embodiment of random access time-frequency slots 500 as may be allocated and signaled by the wireless communication network 100. Table 3 shows a possible 16 RA slot configurations wherein usage and cell allocation depending on the system bandwidth for 16 of these RA slot configurations are illustrated in FIG. 5.

TABLE 3

| PRACH Configuration | RA Period(s) (sub-frames) | Offset (sub-frames) | System Frame Number | Subframe Number |
|---|---|---|---|---|
| 0 | 20 | 1 | Even | 1 |
| 1 | 20 | 4 | Even | 4 |
| 2 | 20 | 7 | Even | 7 |
| 3 | 10 | 1 | Any | 1 |
| 4 | 10 | 4 | Any | 4 |
| 5 | 10 | 7 | Any | 7 |
| 6 | 5 | 1 | Any | 1, 6 |
| 7 | 5 | 2 | Any | 2, 7 |
| 8 | 5 | 3 | Any | 3, 8 |

TABLE 3-continued

| PRACH Configuration | RA Period(s) (sub-frames) | Offset (sub-frames) | System Frame Number | Subframe Number |
|---|---|---|---|---|
| 9 | 3-3-4 | 1 | Any | 1, 4, 7 |
| 10 | 3-3-4 | 2 | Any | 2, 5, 8 |
| 11 | 3-3-4 | 3 | Any | 3, 6, 9 |
| 12 | 2 | 0 | Any | 0, 2, 4, 6, 8 |
| 13 | 2 | 1 | Any | 1, 3, 5, 7, 9 |
| 14 | 1 | 0 | Any | 0, 1, 2, 3, 4, 5, 6, 7, 8, 9 |
| 15 | 20 | 9 | Even | 9 |

As may be seen in FIG. 5, some of the RA slot configurations have been shifted such that the time offset for these RA time-frequency slots are increased by one sub frame. However, the periodic patterns are the same as the embodiment shown in FIG. 4. Also, the RA slot configuration set in FIG. 5 and Table 3 uses the "reserved" configuration 15 of Table 2 to define an additional 20 ms period slot configuration, thus providing non-overlapping allocations of up to four concurrent cells served by the same base station.

Figure 6:
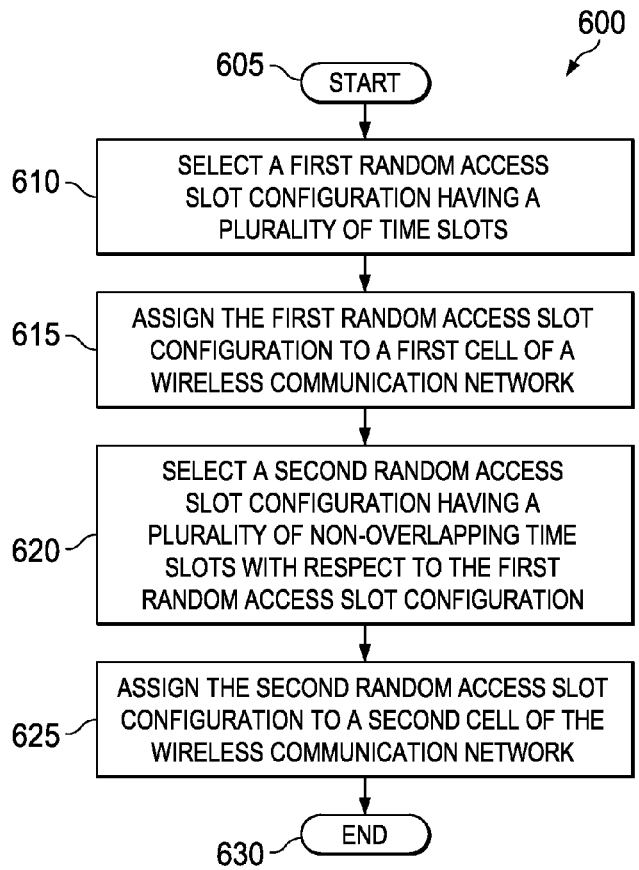
FIG. 6 illustrates a flow diagram of a method of allocating random access configurations carried out according to the principles of the present disclosure.

FIG. 6 illustrates a flow diagram of a method 600 of allocating random access configurations, carried out according to the principles of the present disclosure. The method 600 is for use with a wireless communication network and starts in a step 605. Then, in a step 610, a first random access slot configuration having a plurality of time slots is selected among a pre-defined set of random access slot configurations. Correspondingly, the first random access slot configuration is assigned to a first cell of the wireless communication network in a step 615.

In similar manner, a second random access slot configuration having a plurality of non-overlapping time slots with respect to the first random access slot configuration is selected among the same pre-defined set of random access slot configurations in a step 620. And correspondingly, the second random access slot configuration is assigned to a second cell of the wireless communication network in a step 625.

In one embodiment the first and second random access slot configurations are controlled by the same base station and are assigned to different cells served by this base station. In another embodiment, the first random access slot configuration is controlled by a first base station and the second random access slot configuration is controlled by a second base station. In another embodiment, the first and second base stations are the same base station, and the first and second random access slot configurations are assigned to the same cell. The time slots and non-overlapping time slots decrease for an increase in system bandwidth of the first and second cells. Additionally, a single random access transmission is limited to a duration of one time slot.

In one embodiment, each of the first and second random access slot configurations provides a periodic pattern in time. The periodic pattern for each of the first and second random access slot configurations provides a same periodic pattern that is shifted in time.

In one embodiment, the first and second random access slot configurations provide initial time slots that are referenced to a frame boundary. Additionally, the initial time slots for the first and second random access slot configurations are shifted concurrently in time.

In one embodiment, the first and second random access slot configurations are identified by or referenced to respective first and second cell IDs of the first and second cells. Additionally, the time slots and the non-overlapping time slots are derived from respective first and second cell IDs of the first and second cells. The method 600 ends in a step 630.

The non-overlapping nature of the random access slots of the first and second random access configurations employed by first and second cells controlled by a base station 200 in FIG. 2 allow the random access receiver in FIG. 2 to process in sequence the random access slots of these cells. This allows the random access receiver to balance in time the processing load of the random access detection of the two cells, which minimizes its complexity.

Figure 7:
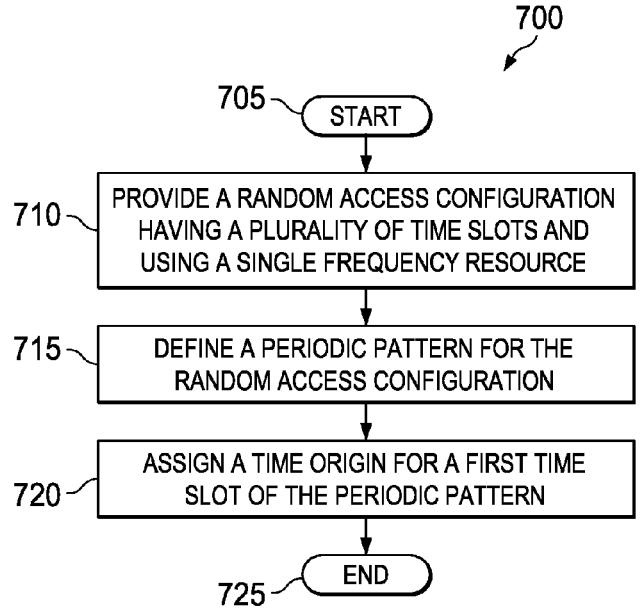
FIG. 7 illustrates a flow diagram of a method of downlink signaling of random access configurations carried out according to the principles of the present disclosure.

FIG. 7 illustrates a flow diagram of a method 700 of downlink signaling of random access configurations, carried out according to the principles of the present disclosure. The method 700 is for use with a wireless communication network and starts in a step 705. Then, in a step 710, a random access configuration is provided having a plurality of time slots wherein a single frequency resource is used for each time slot. One or more contention-based random access transmissions may occur during one time slot and a single random access transmission is limited to the duration of one time slot.

A periodic pattern is defined for the random access configuration in a step 715, and a time origin is assigned for a first time slot of the periodic pattern in a step 720. Both the periodic pattern and the time origin are jointly signaled through an index of the random access configuration. In one embodiment, four bits are used in the index to signal each of twelve or more possible pre-defined random access configurations. In one embodiment, signaling is used to provide the index. The method 700 ends in a step 725.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A method of allocating random access configurations in a wireless communication network, comprising:
   selecting a first random access slot configuration having a plurality of time slots;
   assigning the first random access slot configuration to a first cell of the wireless communication network;
   selecting a second random access slot configuration having a plurality of non-overlapping time slots with respect to the first random access slot configuration; and
   assigning the second random access slot configuration to a second cell of the wireless communication network, wherein the first and second random access slot configurations provide initial time slots that are referenced to a frame boundary.

2. The method as recited in claim 1 wherein a single random access transmission is limited to a duration of one time slot.

3. The method as recited in claim 1 wherein each of the first and second random access slot configurations provides a periodic pattern in time.

4. The method as recited in claim 3 wherein the periodic pattern for each of the first and second random access slot configurations provides a same periodic pattern that is shifted in time.

5. The method as recited in claim 1 wherein the initial time slots for the first and second random access slot configurations are shifted concurrently in time.

6. The method as recited in claim 1 wherein the first and second random access slot configurations are assigned to the same cell.

7. The method as recited in claim 1 wherein periods between the time slots and the non-overlapping time slots decrease for an increase in system bandwidth or random access load of the first and second cells.

8. A method of allocating random access configurations in a wireless communication network, comprising:
   selecting a first random access slot configuration having a plurality of time slots;
   assigning the first random access slot configuration to a first cell of the wireless communication network;
   selecting a second random access slot configuration having a plurality of non-overlapping time slots with respect to the first random access slot configuration; and
   assigning the second random access slot configuration to a second cell of the wireless communication network, wherein the first and second random access slot configurations are identified by or referenced to respective first and second cell IDs of the first and second cells.

9. A method of allocating random access configurations in a wireless communication network, comprising:
   selecting a first random access slot configuration having a plurality of time slots;
   assigning the first random access slot configuration to a first cell of the wireless communication network;
   selecting a second random access slot configuration having a plurality of non-overlapping time slots with respect to the first random access slot configuration; and
   assigning the second random access slot configuration to a second cell of the wireless communication network, wherein initial time offsets of the time slots and the non-overlapping time slots are derived from respective first and second cell IDs of the first and second cells.

10. A method of allocating random access configurations in a wireless communication network, comprising:
    selecting a first random access slot configuration having a plurality of time slots;
    assigning the first random access slot configuration to a first cell of the wireless communication network;
    selecting a second random access slot configuration having a plurality of non-overlapping time slots with respect to the first random access slot configuration; and
    assigning the second random access slot configuration to a second cell of the wireless communication network, wherein the first random access slot configuration is controlled by a first base station a the second random access slot configuration is controlled by a second base station.

11. A method of allocating random access configurations in a wireless communication network, comprising:
    selecting a first random access slot configuration having a plurality of time slots;
    assigning the first random access slot configuration to a first cell of the wireless communication network;
    selecting a second random access slot configuration having a plurality of non-overlapping time slots with respect to the first random access slot configuration; and
    assigning the second random access slot configuration to a second cell of the wireless communication network, wherein the first random access slot configuration is controlled by a first base station and the second random access slot configuration is controlled by a second base station and wherein the first and second base stations are the same base station.

12. A method of downlink signaling of random access configurations in a wireless communication network, comprising:

providing a random access configuration having a plurality of time slots and using a single frequency resource, wherein a plurality of pre-defined random access configurations is known apriori by both the base station and the user equipment;

defining a periodic pattern for the random access configuration; and assigning a time origin for a first time slot of the periodic pattern, wherein both the periodic pattern and the time origin are jointly signaled through an index of the random access configuration.

13. A method of downlink signaling of random access configurations in a wireless communication network, comprising:

providing a random access configuration having a plurality of time slots and using a single frequency resource, wherein a plurality of pre-defined random access configurations is known apriori by both the base station and the user equipment;

defining a periodic pattern for the random access configuration; and assigning a time origin for a first time slot of the periodic pattern, wherein both the periodic pattern and the time origin are jointly signaled through an index of the random access configuration and wherein broadcast signaling is used to provide the index.

* * * * *